United States Patent [19]

Drinkwater et al.

[11] Patent Number: 5,694,229
[45] Date of Patent: Dec. 2, 1997

[54] HOLOGRAPHIC SECURITY DEVICE

[75] Inventors: Kenneth John Drinkwater, London; Brian William Holmes, Twickenham, both of United Kingdom

[73] Assignee: De La Rue Holographics Limited, London, England

[21] Appl. No.: 295,866
[22] PCT Filed: May 25, 1993
[86] PCT No.: PCT/GB93/01078
§ 371 Date: Sep. 7, 1994
§ 102(e) Date: Sep. 7, 1994
[87] PCT Pub. No.: WO93/24333
PCT Pub. Date: Dec. 9, 1993

[30] Foreign Application Priority Data

May 26, 1992 [GB] United Kingdom ............ 9211123

[51] Int. Cl.$^6$ ............... G03H 1/00; G03H 1/22; B42D 15/00; G09C 3/00
[52] U.S. Cl. .............. 359/2; 359/32; 283/94; 380/54
[58] Field of Search ............... 359/2, 22; 283/85, 283/86, 87, 113; 428/916; 380/54; 434/34

[56] References Cited

U.S. PATENT DOCUMENTS

| | | | |
|---|---|---|---|
| 3,620,590 | 11/1971 | Barker | 380/4 |
| 4,498,729 | 2/1985 | Benton | 359/32 |
| 4,684,795 | 8/1987 | Colgate, Jr. | 235/457 |
| 4,921,278 | 5/1990 | Shiang et al. | 283/87 |
| 4,977,620 | 12/1990 | Tacquard et al. | 434/81 |
| 5,003,600 | 3/1991 | Deason et al. | 235/457 |
| 5,396,559 | 3/1995 | McGrew | 380/54 |

FOREIGN PATENT DOCUMENTS

| | | | |
|---|---|---|---|
| 0 132 724 | 3/1987 | European Pat. Off. | G03H 1/00 |
| 62-85805 | 4/1987 | Japan | G01B 11/00 |
| 62-206582 | 9/1987 | Japan | G03H 1/04 |
| 406110379 | 4/1994 | Japan | 389/2 |
| 2 117 133 | 10/1983 | United Kingdom | B42D 15/02 |
| 2 129 739 | 5/1984 | United Kingdom | G03H 1/04 |
| 2 136 352 | 9/1984 | United Kingdom | G03H 1/04 |

OTHER PUBLICATIONS

Huang Wei-shi et al.;"Spacial Moire Hologram;" International Conference on Holography Applications; 2-4 Jul. 1986 Beijing, China; SPIE vol. 673, pp. 66-67.

Graham Saxby; *Practical Holography;* Prentice Hall 1988; pp. 50-52.

*Primary Examiner*—Paul M. Dzierzynski
*Assistant Examiner*—Audrey Chang
*Attorney, Agent, or Firm*—Oliff & Berridge

[57] ABSTRACT

A holographic effect is generated on a holographic security device by diffraction of light by a surface relief pattern on a film. When illuminated, a moire pattern is generated from a pair of overlapping, regular arrays of lines or dots. Each array has a line of symmetry. The lines of symmetry are aligned. The device exhibits an ordered variation in the form of observed moire patterns in a direction parallel with the alignment direction of the lines of symmetry and a color variation but substantially no form variation transverse to alignment direction.

27 Claims, 3 Drawing Sheets

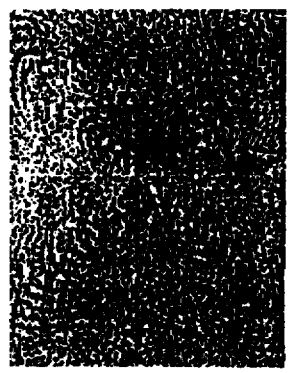
FIG.4A
FIG.4B
FIG.4C FAR LEFT
FIG.4D NEAR LEFT
FIG.4E CENTER
FIG.4F NEAR RIGHT
FIG.4G FAR RIGHT

FIG.5A
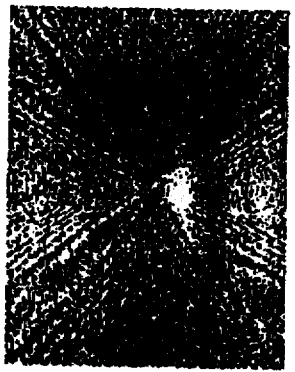
FIG.5B
FIG.5E CENTER
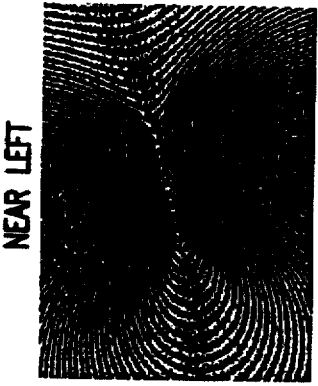
FIG.5D NEAR LEFT
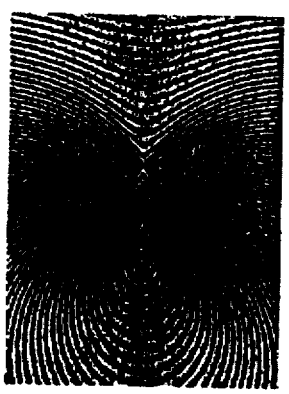
FIG.5C FAR LEFT
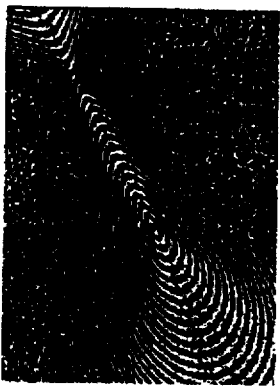
FIG.5G FAR RIGHT
FIG.5F NEAR RIGHT

HOLOGRAPHIC SECURITY DEVICE

BACKGROUND OF THE INVENTION

1. Field of the Invention

The invention relates to a holographic security device and to items carrying such devices.

2. Description of Related Art

Holographic devices such as three-dimensional holograms are widely used as authenticatable devices on security articles such as identification cards, credit cards and the like. Conventional holograms comprise three-dimensional object holograms which project the image of a three-dimensional object which is easily recognisable for authentication purposes. With the increasing sophistication of counterfeiters, simple three-dimensional holograms are no longer as secure as they once were. An attempt was made in the past to produce a more complex hologram as is described in GB-A-2136352. In this case, a stack of transparencies were overlapped and randomly deformed and then used to create a hologram which constituted the moire pattern which resulted from the transparency stack. Although such a resultant pattern is very difficult to counterfeit, the pattern itself is not particularly suitable when the device is to be used for authentication purposes. The pattern will have a random and rather messy form which is not readily authenticatable.

Another example of the use of holograms in the form of moire patterns is described in JP-A-62206582. This document aims to generate as complex a moire pattern as possible which again makes it difficult to authenticate the device.

SUMMARY OF THE INVENTION

In accordance with one aspect of the present invention, we provide a holographic security device in which the holographic effect is generated by the diffraction of light by a surface relief pattern on a film and which, when illuminated, generates a moire pattern produced from a pair of overlapping, regular arrays of lines or dots, wherein each array has a line of symmetry, the lines of symmetry being aligned, and wherein the device exhibits an ordered variation in the form of the observed moire patterns in a direction parallel with the alignment direction of the lines of symmetry and a colour variation but substantially no form variation transverse to the alignment direction.

This aspect of the invention means that on, tilting a hologram containing this feature to observe parallax and depth, a viewer sees a set of consecutive moire fringe patterns generated by the overlap of the two line patterns of very similar form and general arrangement as all these patterns retain a common axis of symmetry. A viewer therefore observes on tilting the hologram a moire pattern that remains substantially uniform in form as the viewing position changes, with moire fringes of consistent shapes moving across the viewing zone in a simple and ordered way. This is in contrast to the previously developed techniques where the intention appears to have been to make the patterns as complex as possible.

Thus in contrast to the previous proposal for utilizing moire patterns in holograms, we have devised a new device in which a particular type of ordered moire pattern is produced. This retains the advantages of reducing the risk of counterfeiting due to the difficulty of re-origination of such moire patterns, but significantly improves the ability of the device to be used for authentication purposes since this ordered moire pattern is easier to recognise and authenticate. By "ordered moire pattern" we mean a relatively simple geometric pattern, having a line of symmetry, which is easily recognisable but very difficult to reproduce.

This invention is primarily intended for use within white light viewable holograms, in which the moire effect is exhibited. These holograms are formed by surface relief patterns which diffract light in order to create the holographic effect. Such surface relief patterns are replicated into polymeric layers in order to mass produce the affect, using a master plate which exhibits the (inverse) surface relief pattern.

Replication can be done by plastic deformation of a plastic film eg under heating, or by curing a polymeric composition under the influence of ultraviolet light or an electron beam while the composition is in intimate contact with a master plate.

Typically, the holographic device comprises a rainbow hologram created using a Benton slit. Such a hologram exhibits parallax in a direction parallel with the length of the Benton slit and a colour rainbow variation in a direction orthogonal to the slit direction. In this case, the line of symmetry will be maintained as the holographic device is tilted while the line of horizontal symmetry remains fixed and constant. This provides the following particular constraints on the patterns and geometry:

a) The individual patterns that are used to contribute to the final recorded moire pattern must have a line of symmetry that is parallel to the Benton slit (ie. horizontal or at least part of them must have such symmetry).

b) The lines of symmetry of the patterns contributing to the moire pattern and the Benton rainbow slit (typically the slit hologram used to record an H1 prior to producing a Benton rainbow hologram after holographic transfer on H2) must lie in the same plane during exposure.

These constraints mean that as the viewer changes parallax looking at different viewing positions in the hologram the viewer sees no change in the relative positions of the patterns vertically (ie. perpendicular to the Benton slit) so that as the view position moves along the Benton rainbow slit (ie. parallax changing) the moire pattern changes in form dramatically, whilst retaining the same original horizontal line of symmetry for all view points. This special constraint provides a visually simple and very distinctive moire pattern with a simple and characteristic variability on tilting making the resulting effect very suitable and effective as a public recognition security device. The other advantage is that this constraint also involves a very particular relative geometry of pattern symmetry lines and Benton hologram rainbow slit (ie. they must lie in the same plane). The moire pattern will be sensitive in its form to any small changes in vertical position (ie. going out of the plane of geometry) and even small changes from this geometry should cause a relatively large change in the form of the moire pattern and in particular will cause the line of symmetry of the pattern to tilt dramatically away from the horizontal symmetry. This therefore makes reorigination very difficult because of the particular geometries and line forms required and also makes the pattern easy to authenticate as small changes from the defined required geometry should fairly dramatically alter the form of the moire pattern making it very difficult to reproduce. The pattern itself is generally also of a highly recognisable form as it retains a horizontal line of symmetry as parallax is altered.

The image produced by the holographic device will thus comprise a characteristic, ordered moire pattern which will move in a very characteristic fringe pattern as the holographic device is tilted to reveal different parallax views of the moire fringes.

In one arrangement, the moire pattern itself is recorded in the holographic device by utilizing transparencies incorporating the respective arrays. In another approach, the arrays themselves may be recorded individually through slits in the holographic device so that when illuminated they are generated in different planes and at predetermined offsets so that the moire pattern is generated as the hologram is viewed.

The arrays themselves will typically comprise similar regular arrays of spaced lines or dots although this is not essential and for example one array could comprise a set of lines while the other could comprise a set of dots. In general, the arrays can provide patterns consisting of lines, circles or more complex patterns and the moire pattern could be formed between two or potentially more of these patterns.

For a counterfeiter to reproduce the characteristic moire fringe pattern and the way in which it varies across the parallax of the hologram would require not only reproduction of the artwork and spacing but also reproduction to close tolerances of the exposure geometry of the hologram (i.e. the vertical viewpoint of the pattern)—especially as the moire pattern form is sensitive to this type of variation and can be made to change rapidly and markedly in form for small changes.

This makes reorigination particularly difficult, for example if a moire pattern is formed between two sets of regularly spaced concentric circle patterns, offset both horizontally and vertically, and by depth within a hologram, then if the centres are overlaid, the patterns are circular, if the centres are offset horizontally, the patterns become distorted ellipses about the horizontal axis on one side and distorted vertical lines on the other side. Now if this pattern is recorded into the hologram, and if reorigination was attempted with the same patterns and relative positions but with a slightly different viewpoint for the holographic exposure, the resultant moire pattern would be grossly and obviously distorted from its original form. Herein lies a method for producing highly unique moire fringe patterns within a holographic image which would move with parallax changes on viewing and whose characteristic form, pattern and movement pattern would be extremely, if not prohibitively, difficult to reproduce.

In some cases, the holographic device may only generate an ordered moire pattern. However, in other cases the holographic device generates a further image, such as a three-dimensional object or 2D/3D hologram, which may be separate from the ordered moire pattern. Preferably, however, the moire pattern forms a background to the other image.

Typically, the holograms will be surface relief devices and these can be formed by cold or hot pressing of a master plate eg a nickel shim, having the (inverse) surface pattern against a plastic film such as a thermoplastic polymeric film which may be metallised, etc., or by replicating the surface by causing a polymerisable lacquer to cure while held in intimate contact with the master plate under the influence of ultraviolet or electron beam radiation.

The holographic effect may be exhibited in a holographic hot stamping foil, a holographic security sealing tape, holographic labels and the like. In a preferred embodiment the holographic hot stamping foil is used to provide security devices on security documents such as financial transaction cards such as credit cards, charge cards, debit cards, cash withdrawal cards, which are generally composed of poly (vinyl chloride) and are magnetically striped, but they may also be used on identity cards, bank cards, charge cards, debit cards, cash withdrawal cards, which are generally composed of poly(vinyl chloride) and are magnetically striped, but they may also be used on identity cards, bank cheques, bonds, certificates, bank notes, travellers cheques, passes, vouchers, entrance tickets, travel tickets, boarding cards, licences, passports, passbooks, excise documents, brand authenticity labels, security packaging materials such as valuable document bags, coin or token wrapping materials, tamper evident labels and seals for goods, authenticity labels, quality control labels and the like, certificates of origin of goods and the like.

The holograms may be principally reflective in their viewing such as being formed as a surface relief pattern in a transparent plastic film, which patterned surface is metallised for example with a substantially opaque layer of aluminium. Alternatively the holograms may be partly reflective and partly transparent such as when the above transparent film would be coated with a thin layer of a material having a higher refractive index than the plastic such as zinc sulphide: such transparent holograms can be used as overlays for passport photographs and the like.

A useful method of incorporating this into a hologram could be to produce a standard 2D/3D image as is known in the art, and then, as one component image, use two fine line patterns combined with the necessary artwork mask for that area. If one fine line pattern is positioned just in front of the final planned image plane (e.g. 1-2 mm), and the other fine line pattern is positioned just behind the image plane (e.g. 1-2 mm) then on final reconstruction in normal lighting this will minimise the image blur of the fine line patterns being used, so keeping the contrast of the final moire pattern as high as possible, with a reasonably large depth spacing between the planes to ensure rapid movement. In this case the moire fringes would move in the opposite sense to the parallax producing an unusual, distinctive pattern. Equally the two fine line transparencies could be placed behind plane to produce fringes whose natural movement direction on tilting reinforces parallax and depth.

Hence an image could contain a characteristic set of moire fringes which would be observed to move across and around the image in a very characteristic pattern, producing potentially a rapidly varying fringe pattern as the hologram was tilted which could form or move in very characteristic shapes.

The lines forming the arrays may have the same spacing between them or the spacing may vary in a geometrically progressive manner.

In one example using the conventional H1/H2 process, if the final H2 image is produced from a master hologram or H1, as is well known in the rainbow technique (Benton) the H1 will have the form of a large extent in one direction of parallax and a small extent in another direction of parallax. Typically the small extent is in the vertical parallax direction so that on viewing the final image one observes the object from one vertical viewing position with horizontal parallax. Typically also in forming 2D/3D holograms several rainbow master H1 holograms are formed, each of different components of the final image, each of which replays the image at the correct angle to the reference beam to generate the desired colour combination in the final result.

This method of producing the various relative colours in a 2D/3D hologram therefore usually constrains the master H1 rainbow hologram for each individual colour to have a specific (possibly narrowly tunable) vertical viewing position relative to the artwork or object in order to generate the planned final relative image colours. One can also generate the final image colours by altering the reference beam angle between H2 transfers of each particular H1 although again this technique constrains the H1 to have a fixed vertical viewpoint on transfer.

For a general literature discussion of holographic H1/H2 transfer techniques a suitable reference text is "Practical Holography", Graham Saxby, published by Prentice Hall Int.(UK) Ltd. 1988.

If therefore, the form of a pattern formed by the object (in this case the moire pattern) requires a very particular viewing position in order to produce the desired pattern and if additionally this pattern becomes very obviously changed and distorted for small changes in viewing position of the H1 relative to the artwork then it is evident that such a pattern would be very difficult to reoriginate by a counterfeiter. In particular, even should the counterfeiter be able to reproduce the artwork approximately by eye—the moire pattern fringes and rapidity of fringe movement with parallax are very sensitive to both the exact form and pitch of the artwork and also the moire pattern formed is extremely sensitive to small changes in vertical viewing position. This therefore would be sensitive to even small errors in geometry and artwork by a would-be counterfeiter for example in the number of fringes that cross the parallax edge of a hologram as it is tilted, or their overall form.

Obviously also if the final resultant pattern is actually formed by the simultaneous replay and moire interference of two line patterns originally recorded in different component rainbow H1's (each requiring particular shooting and transfer geometry) then the form of the resultant pattern will require very careful preplanning in shooting geometry for each of the contributing patterns and will also involve an additional constraint on transfer reference beam angles and colour. thus very considerable extra difficulty and complexity can be added to the reorigination process that a counterfeiter would be forced to follow.

In accordance with a second aspect of the present invention, we provide a holographic security device having a surface relief which, when illuminated, generates a regular array of lines or dots which, when viewed in conjunction with another regular array of lines or dots, generates a moire pattern wherein each array has a line of symmetry, the moire pattern being generated when the lines of symmetry are aligned, exhibiting an ordered variation in the form of the observed moire patterns in a direction parallel to the alignment direction, and exhibiting a colour variation but substantially no form variation transverse to the alignment direction.

This aspect of the invention provides a particularly advantageous authenticating feature since the feature is not readily apparent from the holographic device itself but only when the device is viewed in conjunction with another array. This array could be contained within a transparency but preferably is defined in a hologram in its own right which projects an array of regular lines or dots onto the array generated by the holographic device. The viewer can then view the moire pattern in much the same way as described earlier in conjunction with the first aspect of the invention.

As before, the holographic device may also incorporate a holographic image which preferably is a foreground image with the regularly spaced lines or dots forming a background.

In a typical example, an image of a fine line pattern forms either the whole or one component image in an embossed holographic image. This fine line pattern is regularly spaced, or has regularly spaced areas and could consist of lines, circles or other regular patterns and is positioned at a particular depth within the holographic image. When ordinarily viewed by an observer, no special effects would be seen and the linework would be so fine as to be non-discernable or just discernible as a background or texture. Optionally, only certain areas would consist of regularly spaced lines or patterns whilst the other areas would consist of visually identical, but in part irregularly spaced lines or patterns so that the regularly spaced regions could be subsequently revealed as a message or pattern.

The pattern or information stored within the hologram is revealed using moire techniques by viewing the holographic image through an overlaid transparency. This transparency could consist of a straightforward regular fine line pattern approximately matched in form to the fine line pattern stored within the hologram. The transparency could also be of a predetermined form which, when overlaid on the hologram, produces both characteristic moire fringes which move in a characteristic pattern as the hologram is viewed and the parallax changed, and also would move in a characteristic pattern if the view angle was kept constant and the analysing transparency moved across the hologram.

The characteristic moire pattern formed on readout depends both on the stored pattern and analysing pattern and also on the depth of the stored pattern within the hologram relative to the surface. In the case of a stored pattern consisting of just areas of regularly spaced lines with a random pattern, the areas of regularly spaced lines would be revealed by the moire fringes formed between them and the readout transparency so that they would become visible to an observer. This can be used to store a covert validation message.

One could use more than two patterns at different depths to form these characteristic patterns, more complex stored and analysing patterns could be formed by using a plurality of patterns and depths.

As an alternative to using simply a line transparency for decoding the pattern, the decoding transparency could be in the form of a transparent embossed hologram.

Such an object could be formed by embossing and simply not metallising a plastic medium, (e.g. polyester would have good wear resistance and rigidity) which would give a 4-6% reflectivity as opposed to the 60% obtained from aluminium.

When overlaid over the original display hologram and viewed, the holograms would be designed so that both the analysing hologram and the test hologram are reconstructed at similar tilt and view angles so that the two images of fine line patterns were reconstructed and viewed simultaneously so forming a characteristic moire pattern as before. A variation on this is that the analysing transparent hologram could reconstruct its fine line pattern at a particular depth, or position relative to the surface, so further encoding the moire pattern formed between it and the stored pattern.

For example, both holograms could reconstruct at planes some distance behind the image plane so that all encoded holograms would be matched to a decoding transparent hologram, both of a particular linework form and also reconstructing a planar analysing image some distance from image plane—this would make the mechanism less obvious.

This development could therefore provide for holograms containing covert stored information read out by a transparent overlay to produce a visually distinctive pattern. The overlay could either be a conventional transparency or a substantially transparent hologram — the use of the hologram could increase overall system security by a number of routes as above.

In another form of the technique, it may sometimes be advantageous to use extremely fine line patterns (such that the line pattern is rendered totally non-visible by eye). In this instance the moire patterns formed by hologram and analyser could also become so small that it would be difficult to see. In this case a viewer would consist of a simple magnifier adjacent to either a fine line transparency or a transparent hologram. It is possible that such a viewer could consist either of a simple magnifier or a sheet of lenticular or integral lenses as a magnifier, plus an attached transparency or analysing hologram.

In one embodiment, it would be possible to use this technique as an additional security device as standard security holograms for bank cards, etc., in combination with a conventional 2D/3D or 3D image. In another embodiment, it would be possible to use the moire patterned hologram just as a simple diffractive security patch, which could be attached to an article or packaging as, say, a small hot stamped area (to look like, e.g. simple holographic diffraction foil) which could be verified by a suitable hand held visual reader and where the patterns could vary between articles and batches, etc.

Obviously, by appropriate choice of line widths, patterns, periodicity, distances, forms, etc., it is possible to customise both encoded holograms and the reader transparencies so that they are not readily interchangeable between customers and applications and such that the readers cannot easily be interchanged to analyse patterns used in other application areas.

Practical methods of doing this would be to use circular patterns, line patterns, overlaid line patterns (e.g., two parallel line patterns crossed at 90° form interesting analysing patterns on rotation) of widely varying spacings to discriminate between applications.

In accordance with a third aspect of the present invention, a decoder for use with a holographic device according to the second aspect of the present invention comprises a transparent hologram which generates the another array of lines or dots.

We set out below some details concerning the generation of moire effects and some particular examples for use with this invention.

The moire effect is well known. The application in holography and particularly as a security device in a hologram or as an authentication method for a hologram is less well known.

In its simplest form a moire pattern is the term referring to a pattern of dark and light bands that becomes visible in the transmitted image when two fine line patterns, each with a regular spacing, are superimposed. This pattern of dark and light bands is related to the spatial frequencies and relative angles of the two regularly spaced linework patterns. The pattern is formed because in different areas of the linework patterns, either the dark lines are superimposed resulting in a transmission maximum or light fringe, or the dark lines fall so that the lines of one pattern fall into the clear spaces of the other pattern, resulting in a transmission minimum or dark fringe. The spatial frequency of the moire overlap fringes is much coarser than the spatial frequency of the two original fine line patterns.

The formation of a moire pattern relies on the two fine line structures creating it to be of totally regular spacing or form (effectively very coarse gratings). The pattern can be formed between linear or shaped patterns. The simplest case is of two linear patterns where the moire fringe pattern is a regularly spaced set of lines whose pitch is much coarser than that of the creating line patterns and related to their two spacings and overlay angle. For curved patterns — a particular case used in our tests was sets of regularly spaced concentric circles — the pattern is much more complicated in shape and only adopts a simple circularly symmetric format when the centres of the two patterns overlay — otherwise it becomes complex in form depending on the spatial offset of the centre points.

Equally, multiple, superimposed fine line patterns or areas can produce complex moire patterns which can be advantageous for security and also distorted line patterns (e.g. a linear pattern bent or distorted in a shape for a hologram).

So the light and dark pattern is clearly related to the line spacing and relative sizes of the line spacings interfaced — clearly the moire pattern is coarsest and most clearly marked for closely related spacings.

EXAMPLE 1

If two line patterns have spacings $d_1$ and $d_2$ and if $d_1=0.5$ mm and $d_2=0.9d_1$, then the moire fringe distance, L, is $(0.9 \div 0.1) \times 0.5 = 4.5$ mm.

EXAMPLE 2

If $d_1=0.5$ mm and $d_2=0.4d_1$, then $L=(0.4/0.6) \times 0.5 = 0.3$ mm

EXAMPLE 3

If $d_1=0.5$ mm and $d_2=0.1d_1$, $L=0.05$ mm.

Thus, the coarsest and clearest pattern is generated when the line structures are fairly closely matched.

For our examples, we typically used 0.1 mm thick black lines on clear background at a spacing of 0.5 mm with around a 15% difference in the spacings between the two lines (ie. k=0.85). This generates coarse and most easily visible moire bands. The intention is to use fine line patterns at the limits of perception e.g. (0.1 mm at 0.5 mm).

In simple physics terms, the moire pattern spatial frequency is simply the beat frequency between two regularly spaced line patterns overlaid — it is an interesting manifestation of interference phenomena.

Now the distance from a condition where two lines overlap (light fringe) to one where they are in antiphase, and then back to overlapping lines defines the moire spacing between bands.

This spacing is therefore given by:

$$L = nd_1 = (n+1)d_2$$

where n is an integer.

Now for two related lines, say $d_2=kd_1$ where k is less than 1

Then $nd_1 = (n+1)d_2$ so  $\Rightarrow$  $n = k/1 - k$ and
$\Rightarrow$  $L = (k/1 - k)d$ To generate much coarser and therefore clearly visible overlap a 20–10% difference in spacing may be used.

Smaller spacings may be used, about ⅓ size patterns ie. 0.03 mm lines at 0.18 mm spacing. There patterns were invisible by eye but could be used to produce coarse, therefore visible, moire patterns.

e.g. 0.18 mm line of 0.03 mm linewidth overlapping with this structure at 90% magnification gives:

$$L = \frac{k}{1-k} \; d = \frac{.9}{.1} \times .18 = \underline{1.62 \text{ mm}}$$

ie. this width is visible to the eye.

Note that this simple analysis gives a good feel of moire spacings and visibility, although it does not fully explain complex patterns obtained for regularly curved patterns such as concentric circles of ellipses.

Note also that the contrast of the fringes can be changed and optimises for line-space ratios of 1:1 which could give a very high contrast moire pattern.

An advantageous form of pattern uses line patterns approaching the resolution limit of human eye perception (as seen in the final hologram, taking into account blur due to noise, chromatic and spatial effects) but which together reconstruct a clear visible moire interference pattern within the holographic image. Such devices are more difficult to "reverse engineer" as the contributing patterns are less obvious.

Other variations could use very fine contributing line patterns that are definitely beyond the limit of resolution by the human eye, which can also form visual moire patterns or moire patterns only observable under magnification as an additional security enhancement. For these fine lines, a magnifying based viewer was tested successfully.

Holographic devices according to the invention can be utilized on a wide variety of items but particularly security items where the device enables the item to be authenticated. Examples include credit cards, identification cards, banknotes and the like.

The holographic devices according to the invention may be supplied in the form of a hot stamping foil, or a holographic transfer film which may be affixed to a substrate in shaped form by use of patterned adhesives or the like. The hot stamping foil may be used in the manufacture of credit cards and similar magnetically striped financial transaction cards made of PVC, which carry holographic security devices.

One preferred and advantageous form of this invention is to use a "special case" geometry between two linework patterns where the resulting moire pattern is of a particular, quite simple and distinctive form but is drastically altered by small changes in view position. One advantageous case is two concentric circle patterns whose only offset is the horizontal plane. Note that this constrains the elemental rainbow master hologram to always view this artwork normally and that in particular if the pattern were actually recorded into two separate colours of the final rainbow image then reorigination of this image could only be achieved by multiple reference beam/multishot technique in order to conserve both correct colour and view angle for the moire pattern which would add very considerable complexities for a counterfeiter.

BRIEF DESCRIPTION OF THE DRAWINGS

An example of a holographic device according to the invention and its method of preparation will now be described with reference to the accompanying drawings, in which:

FIGS. 4A and 4B illustrate examples of two line patterns which can be used to generate a moire pattern and FIGS. 4C–4G illustrate the appearance of the device in different orientations; and, FIGS. 5A–5G are views similar to FIGS. 4A–4G but illustrating the effect of differently aligned patterns.

DESCRIPTION OF PREFERRED EMBODIMENTS

Figure 1:
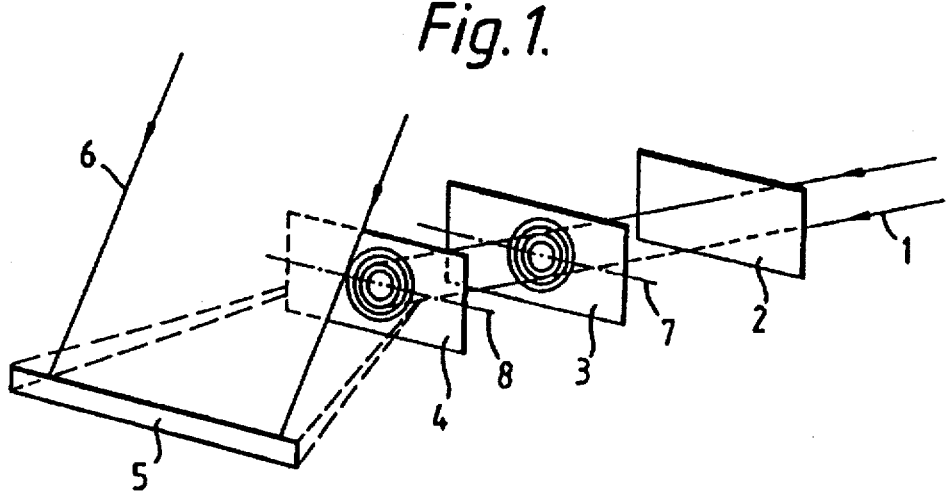
FIG. 1 illustrates schematically the H1 preparation stage.

The method of preparing a holographic device according to the invention is substantially similar to the known method of preparing a Benton type rainbow hologram in which a light beam 1 from a laser (not shown) is passed through a diffuser 2 and from there through a pair of line pattern objects 3, 4 comprising sets of concentric circles. The resulting moire pattern after interference with a reference beam 6 in a conventional manner is recorded through a slit 5 in a mask (not shown) onto a record medium (not shown) as a H1 hologram. It will be noted that each of the line patterns 3, 4 has a line of symmetry 7,8 respectively which are coplanar and also coplanar with the length of the slit 5. Typical dimensions of the slit 5 will be between 300 and 400 mm×10 mm. Typically, the known way of producing "multicolour" rainbow images is to record several H1 holograms of different aspects of the object either on the same plate in different positions or from the same view angle with multiple reference beams used in the second stage to generate the colours.

Figure 2:
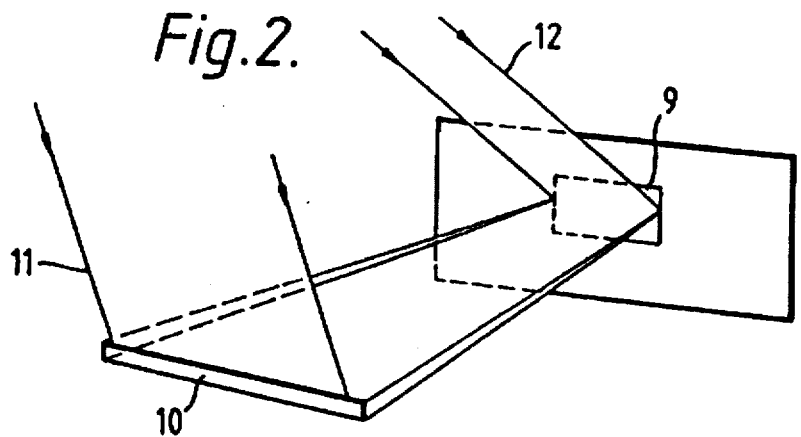
FIG. 2 illustrates schematically the H2 preparation stage.

FIG. 2 illustrates the production of the final H2 hologram 9 in which the H1 hologram 10 is exposed to a reference beam 11, the resulting hologram defining a real image which forms the object for mixing with a second reference beam 12 to define a final hologram which is recorded as the H2 hologram 9. The final image replays exactly what the original H1 hologram saw so that in the Benton rainbow technique the final image shows the object with one direction of parallax (horizontal) and with the parallax restricted in the direction of diffraction (vertical) to a single view position with just changes in colour on tilting by diffraction.

Figure 3:
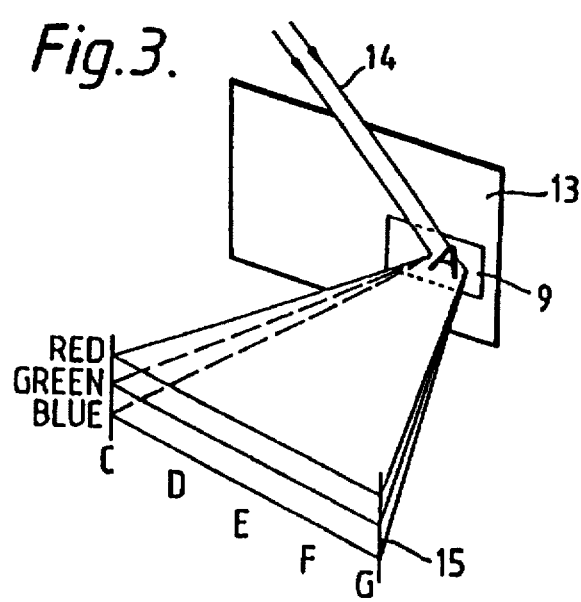
FIG. 3 illustrates the device on a security document and its method of reproduction.

FIG. 3 illustrates the resultant hologram 9 mounted on a security document 13 such as a credit card and being exposed to light 14 which reconstructs an image of the original object in a plane 15. As indicated, the colour of the reconstructed image varies from red to blue in the vertical direction.

In a horizontal direction a parallax effect can be observed. This is illustrated in FIG. 4.

FIGS. 4A and 4B illustrate examples of two original line patterns used to constitute the patterns 3, 4 in FIG. 1. As can be seen, in this example, the line patterns comprise sets of concentric circles of regular spacing. FIGS. 4C–4G illustrate the appearance of the resultant holographic device in different orientations when viewed from a common position looking towards positions C–G indicated in FIG. 3. As can be seen, the resultant patterns retain an axis of horizontal symmetry and remain simple in form consisting of expanding circular rings on one side moving off the field of view and dominant vertical lines moving off the field of view to the other side.

FIG. 5 illustrates the effect of a misalignment of the two line patterns, shown again in FIGS. 5A and 5B, and thus illustrate the effect of attempts to counterfeit the device illustrated in FIG. 4. As can be seen, the pattern does not retain any horizontal symmetry or any common form between views. Indeed, the pattern changes dramatically as the view position changes.

The difference between this development and GB-A-2136352 is that the intention here is to form moire patterns within the holograms which are of simple and distinctive format (eg. essentially vertical lines one corner of image and concentric circles other corner) and to make these patterns simple and recognisable and very difficult to reproduce because of the complexities of not only reproducing the artwork but also the precise exposure geometry to obtain the simple, special case patterns aimed for. It is an intention of the invention always to create moire patterns whose form is grossly changed by small changes in vertical view angle (and which therefore have a horizontal line of symmetry) as this provides a particularly effective device against reorigination as detailed in the technical description above.

In other examples, each of the line patterns 3, 4 could be exposed separately through Benton slits onto a recording medium so that when the medium is exposed to light, the line patterns will be holographically reproduced and then interfere to generate the required moire pattern.

In a further variation, just one of the line patterns 3, 4 could be recorded in a recording medium using the Benton slit technique and this device would then be authenticated by placing the device in a decoder which contains a record of the other line pattern 4 after recording through a Benton slit so that if the two holograms are aligned correctly the required moire pattern well result.

The moire effect techniques detailed above are designed to protect a security display hologram from counterfeit by direct reorigination by making reproduction of the image very difficult. For such security holograms it would also be advantageous to protect them from so called contact copying. This technique involves reconstructing the embossed image in laser light with a holographic recording material placed in close contact the in contact medium records both a reference beam and the reconstructed object beam to form what can be a reasonable replica hologram. A second technique known as remastering again involves reconstructing the embossed image under laser light, capturing the reconstructed image far out of image plane in an intermediate hologram and then using this intermediate hologram as a new master to form a replica image. As both of these techniques involve reconstructing the original image under laser light they can be defeated, or made to produce highly inferior copies by incorporating into the embossed hologram materials or features that are non visible under normal illumination but which under laser illumination severely degrade the image. Convenient ways of achieving this are to incorporate somewhere into the structure of embossed hologram or its overlying substrate a material with a property known as birefringence. Such materials rotate the plane of polarised laser light and if the birefringence changes are random (eg. through substrate thickness or stress variations) then the resulting pattern under linearly polarised laser light (which is required to produce a contact copy or remaster) is a random distribution of dark and light fringes across the image which would severely degrade the copy. Both of these techniques which degrade contact copies could usefully be used in an additional and subsidiary embodiment of this invention to produce a hologram well protected against counterfeit by use of the moire technique and well protected against contact copying and remastering by use of a substrate or component layer designed to produce interference or polarisation rotation effects under laser illumination.

We claim:

1. A holographic security device in which a holographic effect is generated by the diffraction of light, the security device comprising a film having a surface relief pattern produced from at least two overlapping, regular arrays of lines or dots which have been holographically recorded on the film using a Benton slit so as to generate a color variation on tilting of the device, each regular array having an axis of mirror symmetry, the axes of mirror symmetry being aligned with each other and in the same plane as the Benton slit, the surface relief pattern adapted to generate a hologram including a moire pattern having an axis of mirror symmetry in the same plane as the Benton slit and exhibiting an ordered variation in the form of the observed moire pattern in a direction parallel with the alignment direction of the axes of mirror symmetry of the at least two arrays and a color variation but substantially no form variation transverse to the alignment direction.

2. A device according to claim 1, wherein the moire pattern is recorded in the device.

3. A device according to claim 1 wherein the arrays are defined by substantially similar sets of regularly spaced lines or dots.

4. A device according to claim 1 wherein the arrays of lines or dots define one or more patterns of rectilinear lines, curves, and circles.

5. A device according to claim 1 wherein the moire pattern is only visible under magnification.

6. A device according to claim 1 wherein the device also generates a holographic image of an object or a holographic 2D/3D effect.

7. A device according to claim 6, wherein the moire pattern forms a background to the image or 2D/3D effect.

8. A device according to claim 1 further comprising means for producing interference effects when the device undergoes laser illumination, to prevent remastering.

9. A device according to claim 8, wherein the said means comprises a depolarizing layer.

10. A device according to claim 1 wherein the device exhibits the holographic effect under white light illumination.

11. An article carrying a holographic security device according to claim 1 to enable the article to be authenticated.

12. A transferable holographic film comprising a holographic security device according to claim 1.

13. A film according to claim 12, wherein the film is provided on a hot stamping tape.

14. A method of enhancing the security of an item comprising selectively transferring a holographic security device from a film according to claim 13 onto the item.

15. A method according to claim 14, wherein the item is a transaction card.

16. A device according to claim 1, wherein the at least two arrays comprise regular overlapping circular or elliptical line patterns.

17. A device according to claim 16, wherein the centers of the at least two arrays are offset from each other along the axis of symmetry.

18. A device according to claim 1, wherein the moire pattern comprises two different geometric shapes.

19. A device according to claim 18, wherein the two geometric shapes are each symmetrical about the axis of symmetry.

20. A device according to claim 18, wherein one of the geometric shapes is substantially curved and the other of the geometric shapes is substantially linear.

21. A holographic security device comprising a surface relief on a film, the surface relief produced from a regular array of lines or dots which has been holographically recorded on the film using a Benton slit so as to generate a color variation on tilting the device, the regular array having an axis of mirror symmetry in the same plane as the Benton slit, the security device further comprising a transparent member separate from the film and having another regular array on lines or dots on the transparent member, the another array having an axis of mirror symmetry, the surface relief and the another array on the transparent member, member adapted to generate a moire pattern having an axis of mirror symmetry when the axes of mirror symmetry of the arrays are aligned with each other and in the same plane as the Benton slit, and exhibiting an ordered variation in the form of the observed moire pattern in a direction parallel to the alignment direction, and exhibiting a color variation but substantially no form variation transverse to the alignment direction.

22. A device according to claim 21, wherein the another array is holographically recorded using a Benton slit and has an axis of mirror symmetry in the same plane as the Benton slit.

23. A device according to claim 22, wherein the another regular array of lines or dots is holographically recorded in the form of a surface relief on the transparent member.

24. A device according to claim 21, wherein the holographic device generates a regular array of dots which, when viewed in conjunction with another regular array of lines or dots, generates an ordered moire pattern which defines a recognisable image, the regular array of dots being concealed amongst a set of randomly placed dots.

25. A method of authenticating an article containing the film having the surface relief according to claim 21, the method comprising viewing the surface relief on the article through the transparent member containing the another regular array of lines or dots to determine whether the resultant image constitutes a moire pattern which exhibits parallax in a direction parallel to the alignment direction, and a color variation transverse to the alignment direction.

26. A device according to claim 21, wherein the regular array and the another regular array comprise regular overlapping circular or elliptical line patterns.

27. A device according to claim 26, wherein the centers of the at least two arrays are offset from each other along the axis of symmetry.

* * * * *